United States Patent [19]
Lenhard

[11] Patent Number: 6,023,108
[45] Date of Patent: Feb. 8, 2000

[54] ELECTRICAL CIRCUIT ARRANGEMENT

[75] Inventor: Holger Lenhard, Dortmund, Germany

[73] Assignee: Leopold Kostal GmbH & Co. KG, Ludenscheid, Germany

[21] Appl. No.: 09/124,486

[22] Filed: Jul. 29, 1998

[30] Foreign Application Priority Data

Jul. 31, 1997 [DE] Germany ............................ 197 33 019

[51] Int. Cl.[7] ........................................................ H02J 1/14
[52] U.S. Cl. ............................ 307/10.1; 307/38; 307/39; 307/125; 340/825.06
[58] Field of Search .............................. 307/10.1, 38, 39, 307/125; 701/29; 340/825.06

[56] References Cited

U.S. PATENT DOCUMENTS

| | | | |
|---|---|---|---|
| 4,639,609 | 1/1987 | Floyd et al. | 307/38 |
| 5,497,322 | 3/1996 | Kolomyski et al. | 701/29 |
| 5,754,021 | 5/1998 | Kojima | 307/10.1 |
| 5,794,055 | 8/1998 | Langer et al. | 713/300 |

*Primary Examiner*—Albert W. Paladini
*Attorney, Agent, or Firm*—Brooks & Kushman P.C.

[57] ABSTRACT

An electrical switching circuit for a plurality of electrical consumers which are disposed preferably in a motor vehicle and which can be switched on and off respectively by way of a switching device in the proximity of the electrical consumers and which are connected on the one hand directly to one pole of a d.c. supply, wherein for the purpose of reducing the number of connection lines each electrical consumer together with its switching device in the proximity thereof is connected to an electronic unit comprising a power stage and a control stage by only one electrical line and a change in the switched state of a switching device is detected by the control stage by way of its monitoring input connected to the power stage and is used by way of its control output likewise connected to the power stage in order to switch over the associated power driver.

4 Claims, 1 Drawing Sheet

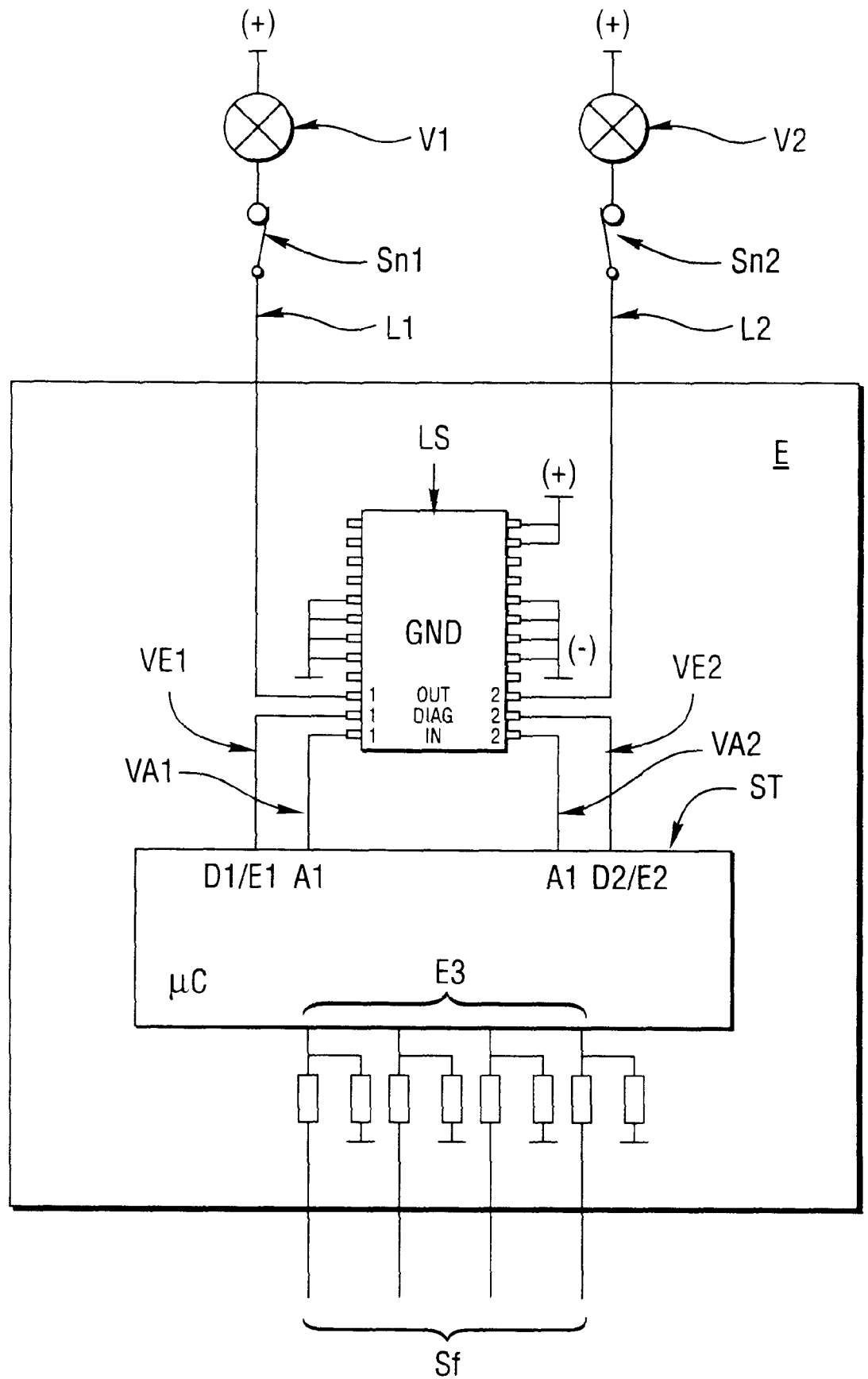

ELECTRICAL CIRCUIT ARRANGEMENT

DESCRIPTION

The present invention relates to an electrical circuit arrangement which comprises a plurality of electrical consumers which are connected in each case with one connection directly connected to one pole of a d.c. supply and whose other connection is connected in each case with a remotely disposed electronic unit which comprises both a power stage and also a control stage and which electrical consumers can in each case be switched on and off by way of a switching device in the proximity of said consumers.

Such circuit arrangements are provided in a motor vehicle inter alia for the purpose of switching on and off individually the lights which are provided distributed in the passenger compartment, are associated with an inner compartment lighting system and which are regarded as electrical consumers.

In this connection it has been hitherto usual to connect in each case an electrical connection of these lights directly to one pole of the d.c. supply i.e. the wiring system, and to connect the other pole on the one hand to the other connection by way of a connection line comprising a so-called switching device in the proximity of the consumer. On the other hand, at least some of the lights can also be switched on or off in each case by way of one or a plurality of so-called electrical consumer-remote switching devices, for which purpose in each case a connection line associated with such switching devices is connected to the other connection respectively.

Furthermore, it is generally known to allocate to the lights associated with the internal compartment lighting system of a motor vehicle a remotely disposed electronic unit, wherein the lights are connected with one of their connections on the one hand directly to one (the positive) pole of the d.c. supply and on the other hand are connected by way of a switching device designed as a so-called make-contact to an input stage of the electronic unit, which input stage recognises the switching position of said switching device. The lights are connected in each case by way of their other connection to a power stage which comprises for each light a power driver. A control stage which consists of a microcomputer is connected to the power stage and also to the input stage, wherein the control stage in addition to the normally initiated switching on and off of the lights also performs a diagnosis of the light current circuits and performs a response in dependence thereon. The relatively high number of connection lines in this embodiment between the electrical consumers and the electronic unit poses a problem, as does also the relatively high number of electrical connections in the electronic unit itself, and the required input circuitry, the reason being that as a consequence the susceptibility to malfunction is increased.

The object of the present invention is to develop further an electrical circuit arrangement of the type mentioned in the introduction which with a considerably reduced outlay ensures an identical level of functionality.

The object is substantially achieved in accordance with the invention by virtue of the fact that each electrical consumer together with its switching device in the proximity of the electrical consumer is only connected to the electronic unit by way of one electrical connection line and a change in switched state of a switching device is detected by the control stage by way of its monitoring input connected to the power stage and by way of its control output likewise connected to the power stage is used for the purpose of switching over the associated power driver. It is advantageous in the case of such a construction that in particular the connection lines required for the electrical connection between the electrical consumers provided on an exposed site on the motor vehicle and the central electronic unit can be reduced to half the number, whereby the susceptibility of the switching arrangement to malfunction is considerably reduced.

Further particularly favourable embodiments of the subject matter in accordance with the invention are quoted in the subordinate claims and are further explained with reference to an exemplified embodiment illustrated in the drawing.

As is evident from the drawing, a plurality of electrical consumers V which are associated with for example the internal compartment lighting system, i.e. are designed as lights, are disposed in a motor vehicle at an exposed site. Of these, two electrical consumers V1, V2 are illustrated by way of example. These electrical consumers are connected with one connection directly to one (the positive) pole (+) of the d.c. supply, wherein this pole can be supplied by way of a common connection line allocated to all electrical consumers. The other connection of each electrical consumer is connected in each case by way of a switching device Sn1, Sn2 which is button-operated and functions as a so-called break contact and is disposed in the proximity of the electrical consumer and furthermore the said other connection is connected in each case by way of an associated connection line L1, L2 to the electronic unit E disposed at the central site in the motor vehicle—such as for example in the so-called central electrics. The electronic unit comprises substantially a power stage LS which is provided with a power driver provided for each electrical consumer respectively and is allocated to a control stage St which is likewise allocated to the electronic unit and consists of a microcomputer $\mu$C. This power stage LS which is designed as an integrated circuit and connected on the one hand to the positive pole (+) and on the other hand to the negative pole (−) connected to earth GND is connected by its two power outputs OUT1,2 to the two electrical consumers V1, V2 by way of the two connection lines L1, L2 and the associated switching devices Sn1, Sn2 in the proximity of the electrical consumers.

From the so-called diagnosis outputs Diag1,2 of the power stage LS there exists in each case an electrical connection, by way of a connection line V1, V2 respectively to the monitoring inputs D1, D2 of the control stage St which simultaneously also represent the control inputs E1, E2 thereof. Finally, the associated inputs In1, 2 of the power stage are connected to the control outputs A1, A2 of the control stage St.

Thus the following functional sequence is possible:

When actuating a switching device Sn by means of a button an interruption in the current circuit is diagnosed by way of the power stage LS and the associated electrical connection VE1, VE2 by the control stage as a result of the corresponding influence on the associated monitoring input D1, D2 and owing to the short interruption the associated power driver is switched over.

In the case of a longer interruption—such as for example caused by a break in the line—then this is likewise expediently recognised according to the duration of time, so that there is no response of the power driver or rather the power driver is switched off by way of the control stage.

Naturally, such a procedure can also be achieved with a switching device which lies in parallel with the electrical consumer and which is designed as a so-called make-contact. In so doing, at the precise moment of the switching process the full short circuit current flows by way of the switching circuit, which is likewise to be diagnosed.

In order also to be able to control the electrical consumers in a manner remote therefrom, the control stage is connected by way of inputs E3 to a plurality of electrical consumer-remote control devices Sf, which can be combined at least partially in the smallest space possible—e.g. in a remote control—and can consist of switching devices to be actuated directly or indirectly.

It is claimed:

1. An electrical switching circuit for switching on and off a plurality of electrical consumers in a motor vehicle, each of the electrical consumers having first and second connections, the electrical switching circuit comprising:

a power supply having first and second poles, the first pole of the power supply connected to each of the first connections of the electrical consumers;

a plurality of switching devices each associated with a respective electrical consumer, each of the switching devices having first and second connections, the first connection of each switching device connected to the second connection of the respective electrical consumer, the switching devices being actuable by a user between on and off states to enable and disable the connection with the electrical consumers; and an electronic unit having a power stage and a control stage, the power stage having a plurality of power drivers each connected to a respective electrical consumer via the second connection of the respective switching device and connected to the second pole of the power supply for providing power to the respective electrical consumer, the control stage having a plurality of monitoring inputs and a plurality of control outputs, each of the monitoring inputs connected to the power stage for monitoring actuation of a respective switching device, each of the control outputs connected to the power stage for switching off a respective power driver when the switching device connected to the respective power driver is in the off state.

2. The electrical switching circuit of claim 1 wherein:

each of the control outputs are connected to the power stage for switching on a respective power driver when the switching device connected to the respective power driver is in the on state.

3. The electrical switching circuit of claim 1 wherein:

the control stage includes a microprocessor.

4. The electrical switching circuit of claim 3 further comprising:

an electrical consumer remote control device connected to a control output of the control stage for switching on and off the power driver connected to the control output.

* * * * *